July 28, 1959 J. E. FLOOD ET AL 2,897,279

AUTOMATIC TELEPHONE EXCHANGE SYSTEMS

Filed Nov. 21, 1956 4 Sheets-Sheet 1

July 28, 1959 J. E. FLOOD ET AL 2,897,279

AUTOMATIC TELEPHONE EXCHANGE SYSTEMS

Filed Nov. 21. 1956 4 Sheets-Sheet 2

United States Patent Office 2,897,279

Patented July 28, 1959

2,897,279

AUTOMATIC TELEPHONE EXCHANGE SYSTEMS

John Edward Flood and Ronald S. Hopkins, London, England, assignors, by mesne assignments, to Siemens Edison Swan, Limited, London, England, a British company Application November 21, 1956, Serial No. 623,669

Claims priority, application Great Britain November 24, 1955

13 Claims. (Cl. 179—18)

This invention relates to automatic telephone exchange systems and the like, in particular to so-called translators as used in such systems for translating a "code" of digits identifying a called exchange into a further code, not necessarily always different from the first, appropriate to the setting up of a route or channel to that exchange and possibly also to the control of other functions such for instance as metering the call. The exchange identification is received by a "register" by which it is sent to the translator, whence the translation is passsed to a "sender" by which the appropriate route is set up and any other functions controlled. The functions of the register and sender are often combined in a so-called register-sender, but this latter term will be used in the following to denote either equipment performing both register and sender functions or simply a combination of register and sender in which each performs its own function. The number required on the called exchange, also identified by a series of digits following those of the exchange identification code, is usually transmitted directly by the register-sender, namely without translation.

As will appear hereinafter, the present invention contemplates using as a translator which may be common to, but separate from, a group of register-senders, a continuously operable information storage device of the kind in which information is stored in digital form in a magnetic or other suitable storage medium capable of assuming a readily detectable condition variable in accordance with such information, storage of the information being effected along one or more continuous tracks on the device by selective variation of said condition in unit areas of the recording medium each corresponding to one digit of information. Information to be stored is "written" on to such a device by means of so-called writing heads of which at least one is provided per track. Likewise the stored information can be "read" from the drum by means of so-called reading heads, again at least one per track, which may be separate from the writing heads or, where it is not required to write and read information simultaneously, may in suitable circumstances be constituted by heads capable of fulfilling both functions.

It is at present expected that the storage device employed will be in the form of a drum, or equivalently of a disc or continuous tape, having at least its operative surface constituted by a magnetic storage medium, storage of digital information being by selective magnetisation of unit areas of the surface. For such a magnetic storage drum or equivalent each reading and/or writing head associated therewith will essentially comprise a small magnetic element defining a magnetic circuit including an air gap and having a small coil linked therewith, the head being in use positioned with the air gap close to the drum surface. For writing, the coil is appropriately energised and the fringing magnetic field induced across the gap correspondingly magnetises the area of the drum surface instantaneously opposite the gap. When reading, the field produced by the area of the magnetised drum surface instantaneously opposite the gap induces a corresponding flux in the magnetic circuit of the head and results in a corresponding output being obtained from the coil.

It has previously been suggested in connection with electronic register-senders to employ a magnetic storage drum for fulfilling in part the combined functions of a register, translator and sender, the register-sender circuits being incorporated in the magnetic drum apparatus itself. The schemes suggested, however, have led to some complexity by requiring information to be fed to the drum from more than one source and sent out from the drum to more than one destination.

It is an object of the present invention to provide a simpler arrangement employing a storage device of the kind set forth as a separate translator which can readily be adapted for use either with electronic or electromagnetic register-senders.

According to the invention translating equipment for an automatic telephone or like exchange employs a storage device of the kind set forth at different "addresses" on which translations corresponding to different codes can be stored in digital form, means for receiving from a register-sender separate from said equipment a code registered therein for which translation is required, and means responsive to such a registered code as received by the translation equipment for selecting the address on the storage device at which the appropriate translation information is stored and sending such information back to register-sender.

By an address on the storage device is meant that portion of its surface area which includes all the unit areas corresponding to the digits which pertain to a particular translation. The digits for each translation may be stored in serial or parallel form. In serial form the digits which make up any one translation are stored in successive unit areas along one and the same track and the address of that translation on the device is therefore the sector of the track which embraces these unit areas: in parallel form the digits comprising any one translation are stored in unit areas located in corresponding positions along respective tracks on the device, the address of the translation then being a narrow strip area extending transversely of the tracks and having a width commensurate with that of each unit area. With the translations stored in serial form the digits of each will, when called for, appear sequentially at the output of one and the same reading head, whereas in parallel form the digits of each translation will appear substantially simultaneously at the outputs of a number of reading heads corresponding to the number of digits. It will be appreciated that for storing the translations the digital information can be fed to the storage device from one and the same source and that likewise the translations taken from the device are fed to a single destination, namely the register-sender which requested the translation.

In carrying out the invention the translator may with advantage be adapted to operate with the translations stored in the storage device in the form of binary digits, namely having two possible values commonly represented by the numerals "0" and "1." This would require, in the case of a magnetic storage device for instance, only two states of magnetisation in which, respectively, the magnetic material is saturated in one direction and the other, corresponding to the 0 and 1 values of each digit. The magnetic storage of such digits could be effected by exciting the coil of an appropriate writing head with either a positive-going or a negative-going pulse for each digit, and the output from a reading head would likewise be a positive-going or negative-going signal for each stored digit, depending on the value (0 or 1) of the latter.

It is contemplated however that as the exchange identification codes are commonly constituted by decimal digits, it will usually be desirable for the translation to be made available in decimal digit form. To this end the binary digits of each translation may be effectively grouped so that each group represents a decimal digit. The decimal digits are then preferably stored in this way in accordance with the so-called two-out-of-five code by which each decimal digit is represented by five binary digits and the ten possible values of the decimal digit are represented by different pairs of the binary digits having the value 1 or 0, the remaining three binary digits having the alternate value, that is 0 or 1, in each case. This two-out-of-five code, which has the advantage of readily permitting error detection as will be described hereinafter, may also be used by a register-sender for sending the decimal digit exchange identifying core to the translator.

To take a specific example, if each exchange identification code as received by a register-sender consists of three decimal digits a convenient size of storage device would be one having a hundred tracks available for storing translations and capable of storing a thousand binary digits per track. Assuming that the translations are stored in serial form the identification code digits can select one of the hundred tracks and a sector of the selected track one-tenth of its total length, this sector therefore having accommodation for a hundred binary digits. If each translation consists of seven decimal digits stored in two-out-of-five code, requiring thirty-five binary digits per translation, then each sector can accommodate two (alternative) translations for each identification code, giving the facility that should a register-sender, on receiving a translation, find that the corresponding route is busy, it can obtain another translation for the same code and set up an alternative route. A third choice of translation and route could be catered for if the storage device had capacity for one thousand and fifty binary digits per track, corresponding to one hundred and five (that is, three times thirty-five) digits per sector.

Still referring to the same example, for selecting the sectoral address at which a translation is stored for a given identification code of three decimal digits, one decimal digit of the code may be used to effect selection of one of ten equal groups into which the hundred reading heads respectively associated with the tracks on the storage device are effectively divided, while another of the code digits is used to select one of the ten reading heads in the selected group, the selected reading head passing the sequentially appearing digits from the corresponding track to the usual reading amplifier: this amplifier may be common to all the reading heads since in effect only one is in use at any time. From the read digits those which were stored in the sector of the track containing the required translation may then be selected by means of a gating circuit which is opened under control of the remaining code digit for the period of time corresponding to the passage of the sector past the reading head, the digits accordingly passed by the gating circuit constituting the required translation, or alternative translations, for the identification code. Where there are alternative translations the digits constituting the one required could be selected by a further gating circuit.

If the binary digits of each translation were stored in parallel rather than serial form, a storage device of the same capacity, namely having a hundred storage tracks capable of accommodating a thousand digits each, could cater for the same number of identification codes and provide two alternative translations for each. This is possible since the thousand addresses on the device (each the width of one unit area as previously mentioned) provide one address for each of the identification codes and can be identified by using three groups of ten address tracks, leaving seventy translation tracks on which, at each address, two translations each of seven decimal digits can be stored in two-out-of-five binary code. In this case each address could be identified by storing a binary digit on each of three address tracks (one from each group) forming a combination exclusive to that address, and the digits of the identification code would select one address track each from the respective groups such that when and only when the address corresponding to the code reaches the reading heads, outputs will appear simultaneously from the heads associated with the three selected tracks. These simultaneous outputs could then cause the opening of a number of gating circuits to pass respective binary digits of the required translation as read at that address by the reading heads associated with the translation tracks.

Generally speaking a complete cycle of operation of the storage device (that is, in the case of a storage drum or disc, a complete revolution) will be required for each translation and since time is also required for receiving the identification code from the register-sender, selecting the address required and sending back the translation, it will usually be necessary to allow one or more cycles of operation between successive cycles on which translations are read off. This may be allowed for by providing a gating circuit which permits translation digits read off from the storage device to be passed to the register-sender only on, say, alternate cycles of operation of the device.

For a fuller understanding of the invention reference will now be made to the accompanying drawings in which.

Figure 1:
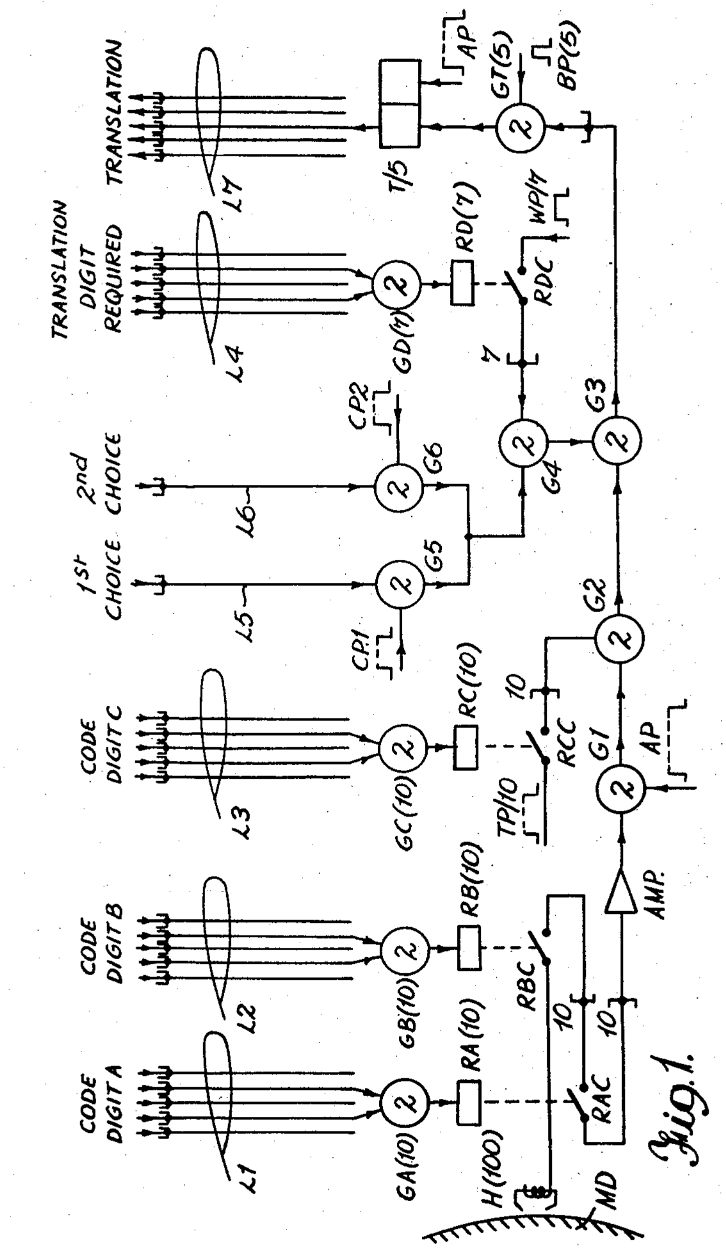
Figs. 1 and 2 are functional diagrams of magnetic drum translators in accordance with the invention, the translator of Fig. 1 operating with the translation digits stored on the drum in serial form and that of Fig. 2 operating with the digits stored in parallel form.
Figure 2:
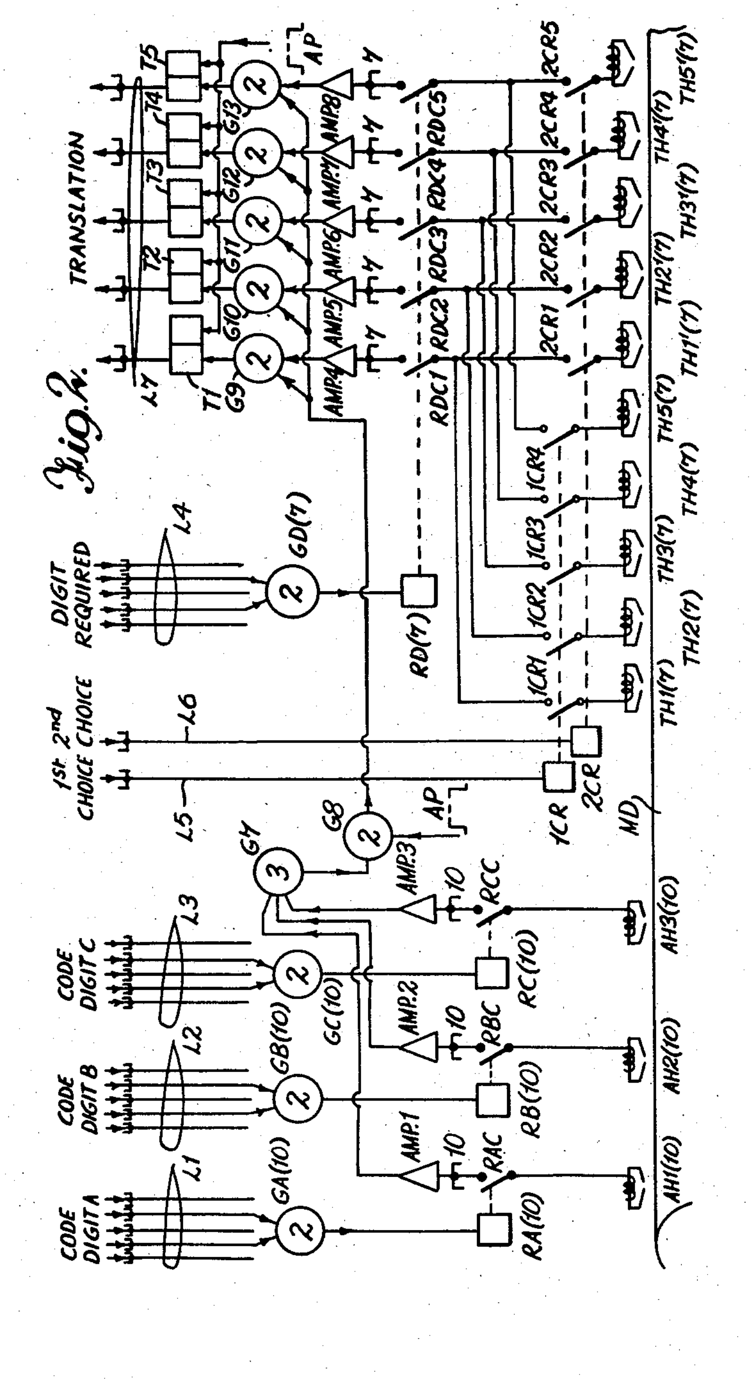
Figure 4:
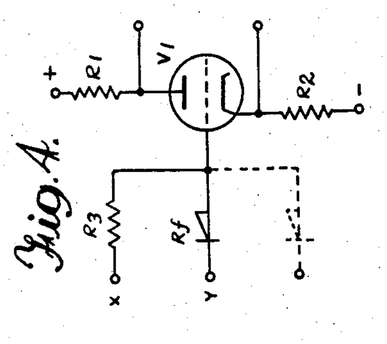
Figure 5:
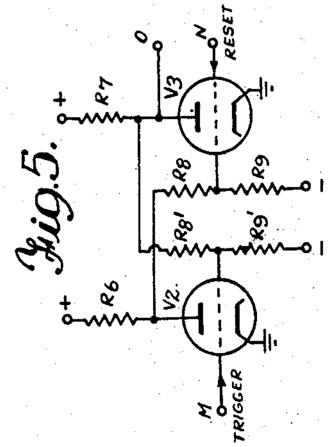
Figures 4A, 5A, 6:
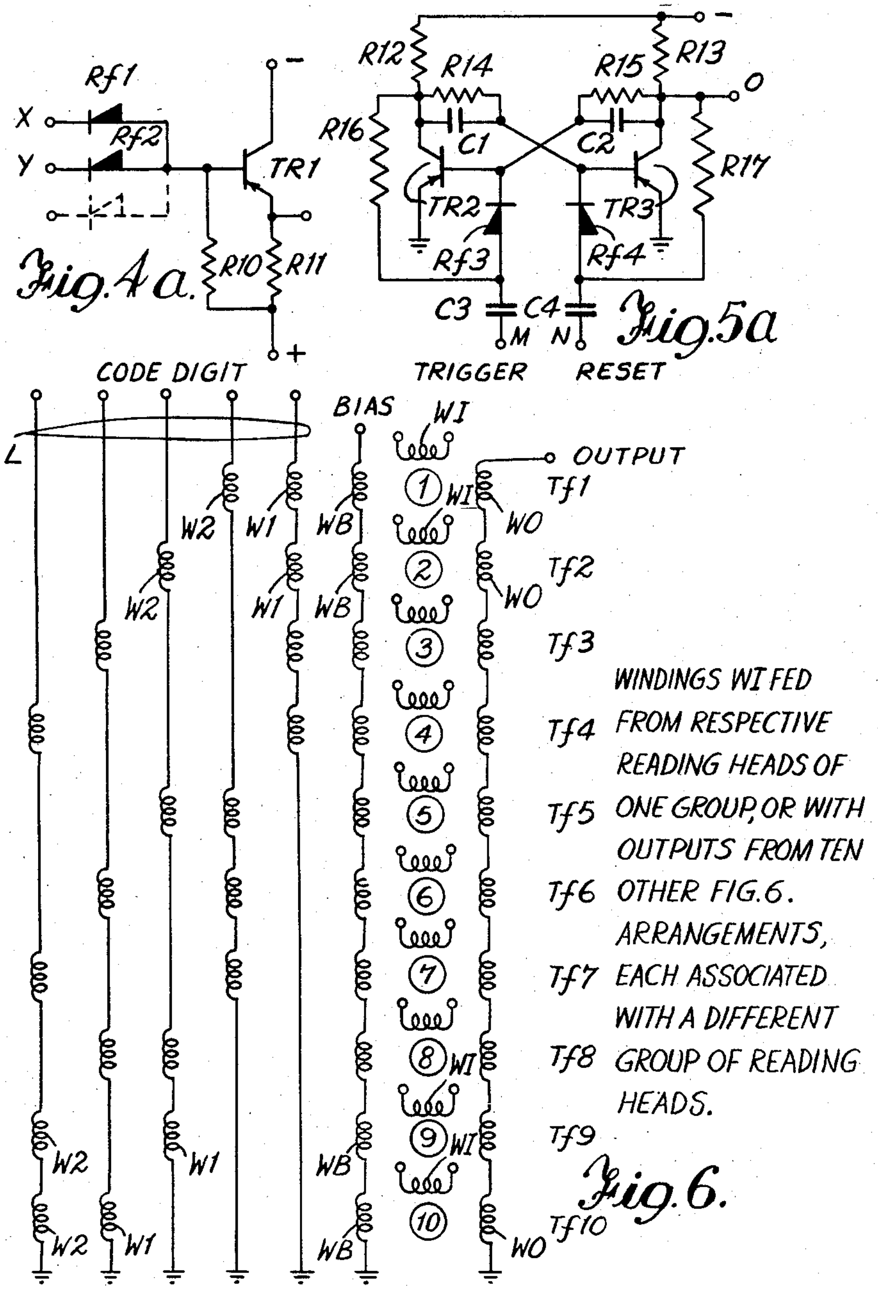

Figs. 4 and 4*a* are diagrams of suitable, alternative circuits for the gates incorporated in the translators of Figs. 1 and 2;

Figs. 5 and 5*a* are diagrams of alternative circuits suitable for the trigger circuits; and Fig. 6 is a diagram illustrating an alternative method of selecting a particular reading head from a group thereof, dependent on the value of a digit received.

In the diagrams of Figs. 1 and 2 various functional symbols are employed to represent the gating circuits, trigger circuits and so on. Thus a gate is represented by a circle having two or more input leads—indicated by an arrow head directed towards the circle—and an output lead, the number inside the circle indicating that a signal will appear on the output lead when and only when appropriate signals are present on that number of input leads. For instance, considering the gate G1 in Fig. 1, in which a pulse AP lasting for a revolution of the storage drum is applied to one input lead of the gate on alternate revolutions and a train of digit pulses from a reading head is applied to the other input lead, a corresponding train of pulses will appear on the output lead from the gate G1 only at such times as the pulse AP is applied, the gate being said to be "opened" by the pulse AP to permit the passage of the digit pulses. In the same way, the gate G7 in Fig. 2 provides an output signal only when its three input leads simultaneously carry a signal, this gate being therefore "opened" in response to the coincident occurrence of pulses on all three input leads.

A two-position trigger circuit is represented by a double rectangle such as T1 in Fig. 2: an input lead to a rectangle having also an output lead extending therefrom indicates that in response to a signal on that input lead the circuit will be triggered to one stable position or state and produce an output signal, while an input lead to the other rectangle indicates that the circuit will be reset to its initial condition by a signal applied to this last lead.

Furthermore in order to make the operation of the translators of Figs. 1 and 2 more immediately apparent, various groups of components performing identical functions and selectively brought into effective operation have been represented only by a typical component of the group, the reference symbol for such component being followed by a numeral indicating the number of components in the group concerned: thus the gate GA (10) is one of ten such gates which are connected to the group of leads for the A code digit and control the operation of respective relays typically represented by the rectangle RA(10). Likewise where a group of similar components are connected to a common lead, only a typical member of the group is shown and a square bracket is applied to the common lead with a numeral appended to indicate the number of components in the group.

It is assumed that the magnetic storage drum has a hundred tracks each having its own reading head: there are therefore a hundred reading heads associated with the drum. It is also assumed that each exchange identification code to be translated consists of three decimal digits and that two alternative translations each of seven decimal digits stored in two-out-of-five binary code are provided for each identification code, the unit areas for storing the necessary number of binary digits per track being equally spaced along the track.

Referring now to Fig. 1, an exchange identification code for which a translation is required is received by the translator from a register-sender (not shown) over three groups of leads L1, L2 and L3 pertaining respectively to the three decimal digits A, B and C of the code. In each group of leads the value of the decimal digit is indicated in two-out-of-five code, the register-sender to this end applying a "mark" that is, a distinctive potential, to a particular combination of two leads in the group, the other leads being unmarked.

Each combination of two leads in the group L1 pertaining to code digit A is connected to a gating circuit, typified by GA(10), which will be opened to produce an output signal when the two leads of the combination are marked: in this way the ten GA gates effectively convert the two-out-of-five marking on the leads of group L1 into a one-out-of-ten marking on the respective output leads of these gates. Likewise each combination of two leads in groups L2 and L3 pertaining to code digits B and C is connected to a gating circuit typified by GB(10) or GC(10). The GA, GB and GC gates control respective relays, typified by RA(10), RB(10) and RC(10), which are energised when the corresponding gates are open. Thus for any particular identification code sent to the translator, one of the RA relays, one of the RB relays and one of the RC relays will be energised.

The energised RA relay closes its contacts RAC to select from the hundred reading heads, typified by H(100), a particular group of ten heads from which the energised RB relay, by closing its contacts RBC, selects the head associated with the track on the storage drum MD on which the required translation is stored in serial form.

Figure 3:
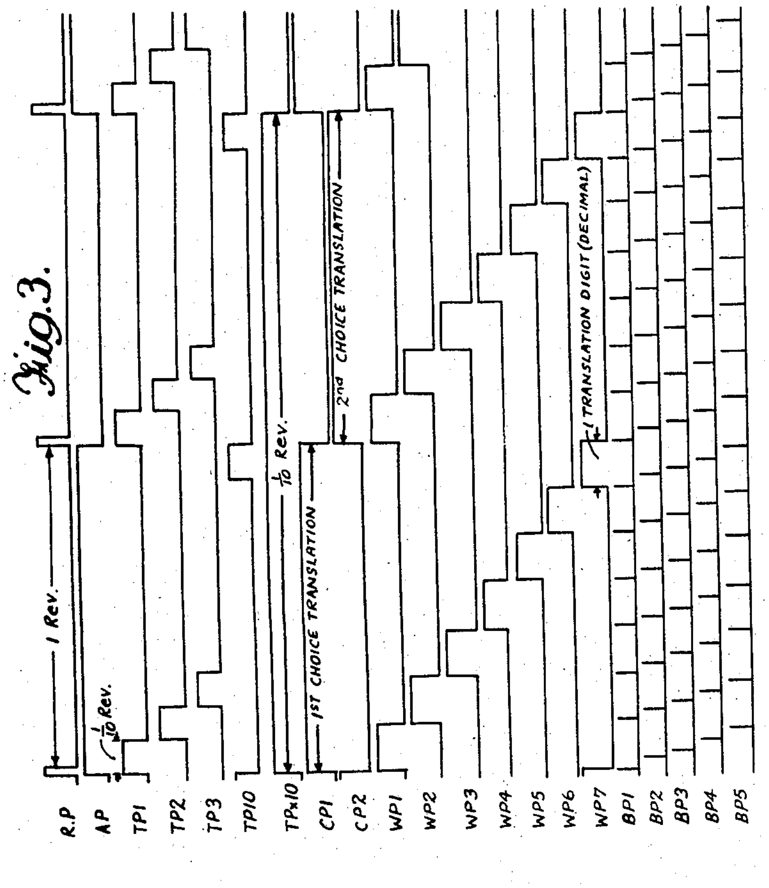
Fig. 3 illustrates the relative timing of various pulses required for the operation of the translator of Fig. 1.

As the drum MD rotates every binary digit on the track thus selected is read off and applied, after amplification in a reading amplifier Amp, to one input lead of a gate G1. On alternate revolutions of the drum the other input lead of the gate G1 has applied to it a pulse AP (see also Fig. 3) which has a duration corresponding to one revolution and may be derived from a revolution marking pulse RP by means of a binary counting stage (not shown). Track selection is effected by energisation of the appropriate RA and RB relays during a revolution of the drum when the pulse AP is not being applied to the gate G1. On the next revolution the pulse AP opens the gate and the binary digits read from the selected track pass to an input lead of a gate G2.

The energised RC relay applies through contacts RCC to the other input lead of gate G2 one of ten pulse trains TP1–TP10 the pulses in each of which have a repetition rate of one per revolution of the drum and a duration corresponding to a tenth of a revolution. These pulse trains are so synchronised with the rotation of the drum and so phased with respect to each other that their respective pulses coincide with the passage past the reading heads of different track sectors each containing the alternative translations for a particular code. Accordingly the TP pulse selectively applied by the energised RC relay to the gate G2 opens this gate to pass to a gate G3 the binary digits derived from the corresponding sector of the selected track and therefore representing both of the alternative translations for the identification code concerned.

Register-senders commonly operate by transmitting successive pulse trains separated by significant pauses. In order to reduce the amount of apparatus in the register-senders it is convenient for the register-sender to take a translation one decimal digit at a time during successive inter-train pauses. To this end a second group of five leads L4 are marked by the register-sender in accordance with a two-out-of-five code to indicate which of the seven decimal digits of a translation is required at any given time. Each of the seven combinations of two leads from the group L4 which may be marked in this way is connected to a gating circuit typified by GD(7). In dependence, then, on which two leads of the group L4 are marked one of the GD gates will be opened to cause energisation of a corresponding relay typified by RD(7). The energised RD relay selectively applies to one input lead of a gate G4 one of seven pulse trains WP1–WP7 the respective pulses of which coincide with the passage past the reading head of different decimal digits of a translation, successive pulses in each train coinciding respectively with corresponding decimal digits from the alternative translations for a code.

The register-sender also marks one or other of two leads L5 and L6, depending on whether the first or second choice of translation is required. These leads L5 and L6 are connected to respective gates G5 and G6 one of which is therefore opened to pass one of two pulses CP1, CP2 coinciding with the passage of the chosen translation past the reading head. The CP pulse thus passed opens the gate G4 to pass to the gate G3 the selected WP pulse occurring during that CP pulse. Accordingly the gate G3 is opened to pass the binary digits which constitute in two-out-of-five code the required decimal digit of the selected translation.

These binary digits, two of which will be "1" and three "0," then pass to each of five gates, typified by GT(5), which are opened cyclically in turn, at times corresponding to the occurrence of successive binary digits, by the application thereto of respective trains of pulses BP1–BP5. Two of these GT gates, namely the two of which the BP pulses coinciding with the "1" digits are applied will therefore produce output pulses which will trigger respective trigger circuits typified by T(5). The two triggered circuits will then mark respective leads of a group L7 leading back to the register-sender, thereby providing the latter with the required digit of the selected translation in two-out-of-five code. The trigger circuits T are reset, at the beginning of each revolution of the drum in which a translation is taken off, by the pulse AP.

The pulses required for the operation of Fig. 1, with the exception of the pulse AP whose derivation has already been referred to, may be derived from "clock" tracks permanently engraved on the drum. Normally twenty-five such tracks would be required, each with one reading head and associated amplifier, but this number could be reduced to five, with an increase in the difficulty of mounting and adjusting the heads, by using a single track with several heads for generating some of the pulse trains: for example one track with ten heads spaced at equal intervals could be used for generating the pulses TP1–TP10. Furthermore the required number of amplifiers could be made less than the number of heads for the clock tracks since, for example, the TP pulse used is selected by a relay (RCC) which could also control the connection of an amplifier common to the heads by which the TP pulses are generated. Likewise a single amplifier could be shared by the WP pulses and one by the CP pulses.

Turning now to the translator of Fig. 2, which operates with the translations stored in parallel form, as hereinbefore set forth, the A, B and C digits of a code to be translated are passed to the translator in two-out-of-five code over respective groups of leads L1, L2 and L3, and by selectively opening one gate from each of three groups of ten, typified by the gates GA(10), GB(10) and GC(10), select for energisation one relay from each of three relay groups typified by RA(10), RB(10) and RC(10). This time, however, the energised RA relay closes its contacts RAC to connect an amplifier Amp1 to one reading head of a group of ten, typified by the head AH1(10) and associated with respective address tracks on the drum MD. Likewise the energised RB and RC relays close their contacts RBC and RCC to connect amplifiers Amp2 and Amp3 to respective reading heads selected one each from two further groups of ten which are typified by the heads AH2(10) and AH3(10) and are associated with a corresponding number of further address tracks, making thirty address tracks in all. The output sides of the amplifiers Amp1, Amp2 and Amp3 are connected to respective input leads of a gate G7 which will be opened to pass an output signal to a further gate G8 when signals appear simultaneously from the three amplifiers. As previously discussed, it is arranged that this condition obtains only when the address on the drum corresponding to the code to be translated is opposite the reading heads.

For selecting a required digit of the translation the register-sender marks two leads of the group L4 as before and thereby opens one of seven gates, typified by GD(7), to energise one of seven relays typified by the relay RD(7). The register-sender also marks one of two leads L5 and L6 to indicate which of the alternative translations stored for the code concerned is required: this results in one or other of two relays 1CR and 2CR being energised.

At each address on the drum the decimal digits for two alternative translations are stored in two-out-of-five binary code in respective groups of five translation tracks—requiring all of the remaining seventy tracks on the drum. Each group of translation tracks is associated with a corresponding group of reading heads, the groups of heads pertaining respectively to the decimal digits of one translation being typified in Fig. 2 by the group TH1(7)—TH5(7) for one such digit and the groups of heads likewise pertaining to the alternative translation being typified by the group TH1′(7)—TH5′(7). The reading heads pertaining to the required translation are selected by the energised relay 1CR or 2CR, as the case may be, by the closure of its contacts such as 1CR1—1CR5 or 2CR1—2CR5, while the heads of the group pertaining to the required digit of the translation so chosen are selected by closure of the contacts RDC1—RDC5 of the energised RD relay.

The outputs from the heads of the group thus selected are applied through amplifiers Amp4—Amp8 to respective gates G9—G13.

A pulse AP, similar to that employed for Fig. 1, opens the gate G8 for alternate revolutions. When, during a revolution for which the gate G8 is open, the address of the required translation for an applied code is reached, the output then obtained from the gate G7, due to signals appearing simultaneously on its three input leads as previously described, passes through the gate G8 and opens the gates G9—G13. The binary digits read at that address by the selected group of the translation track reading heads and representing the required translation digit in two-out-of-five code are then passed by the gates G9—G13 to respective trigger circuits T1—T5 two of which will therefore receive a "1" digit and be triggered, thereby to mark a corresponding pair of leads in the group L7 leading back to the register-sender.

The gating circuits included in the arrangements of Figs. 1 and 2 may each be constituted as shown in Fig. 4. Referring to this figure, the gating circuit comprises a thermionic valve V1 having anode and cathode resistors R1 and R2. The grid of the valve is connected to a first input terminal X through a resistor R3 and to a second input terminal Y through a half-wave rectifier R*f* poled to conduct current in the direction away from the grid. The valve is normally in a non-conductive state. If a positive signal is applied to the terminal X but no signal is applied to the terminal Y, this signal will be diverted away from the grid through the rectifier R*f* and the valve will remain non-conductive. If however a positive signal is applied to the terminal Y at the same time as one is applied to the terminal X, the rectifier R*f* will be backed off by the signal at the Y terminal and the signal at the X terminal will then raise the grid potential of the valve, resulting in the valve becoming conductive. A negative-going output signal will then be obtained at the anode of the valve and a positive-going signal at its cathode, either of these signals being used as may be most suitable for a following circuit. Such output signal is obtained only when both the input terminals X and Y receive a positive signal together. In the case of the gate G7 in Fig. 2, which has to open only on coincidence of three input signals, the grid of the valve V1 would be connected to a third input terminal through a half-wave rectifier poled similarly to the rectifier R*f*, this being indicated by the dotted lines in Fig. 4.

The trigger circuit of Fig. 5 comprises two thermionic valves V2 and V3 having respective anode load resistors R6 and R7. The anode of each valve is connected through two series-connected resistors R8 and R9 or R8′ and R9′ to a source of negative bias, the junction of the series-connected resistors being connected to the control grid of the alternate valve. With the valve V2 cut off its anode is at the positive H.T. potential and biases the valve V3 to the conducting condition through the potentiometer constituted by the resistors R8, R9. Application of a positive potential to terminal M causes valve V2 to conduct so that its anode potential falls and the grid potential of valve V3 is likewise reduced to cut off the latter valve and produce a corresponding positive-going output signal at the terminal O connected to the anode. The grid of the valve V2 is then positively biased from the anode of the valve V3 through the potentiometer constituted by the resistors R8′, R9′, so that the valve V2 remains conducting even after the triggering potential has been removed from terminal M. The circuit is reset by the application of a positive potential to the terminal N, when a similar operation will be produced in reverse.

Instead of being constituted by circuits employing thermionic valves as in Figs. 4 and 5, the gating and trigger circuits could be constituted by transistor circuits such as those of Figs. 4*a* and 5*a* respectively.

The gating circuit of Fig. 4*a* comprises a transistor TR1 having its base and emitter electrodes connected through respective resistors R10 and R11 to a source (+) of positive potential, the collector electrode of the transistor TR1 being connected to a source (−) of suitable negative potential. The transistor base is also connected to input terminals X and Y through respective rectifiers R*f*1 and R*f*2 poled to conduct away from the base. The transistor is normally biased to its fully conductive state by standing negative potentials at terminals X and Y. If a positive signal is applied to the input terminal X but no such signal is applied to the other input terminal Y, the applied signal will raise the potential of the input terminal X to back-off rectifier R*f*1 but the transistor TR1 will remain conductive since its base is still held negative by the standing potential at the input terminal Y. Likewise if a positive signal is applied to the input terminal Y but not to the terminal X rectifier R*f*2 will be backed off but the transistor will still remain conductive due to the standing negative potential at the input terminal X. However, if positive signals are applied to both terminals at once the rectifiers R*f*1 and R*f*2 will both be backed off and the base potential of the transistor will be raised to a more positive potential, tending to cut-off the transistor. This will reduce the emitter current and therefore the voltage drop across the resistor R11, with the result that the potential at the output terminal O will rise to give a positive output signal. In the case of the "coincidence-of-three" gate G7 in Fig. 2, the base of the transistor would be connected through a further rectifier, indicated in dotted lines, to a third input terminal to which it would be arranged that a positive signal would have to be applied, coincidently with the other two before the transistor conduction would be reduced to produce an output signal.

The transistor trigger circuit of Fig. 5*a* comprises two earthed emitter transistors TR2 and TR3 having their collector electrodes connected to a source (−) of negative potential through respective resistors R12 and R13. The base electrode of transistor TR3 is connected to the collector electrode of transistor TR2 through resistor R14 in parallel with capacitor C1, and the base of transistor TR2 is likewise connected to the collector of transistor TR3 through resistor R15 in parallel with capacitor C2. The base of transistor TR2 is connected to a "trigger" input terminal M through a rectifier R*f*3 in series with a capacitor C3, and the base of transistor TR3 is connected to a "reset" terminal N through rectifier R*f*4 and capacitor C4 in series, the collector of transistor TR2 being connected through a resistor R16 to the junction of rectifier R*f*3 and capacitor C3, and the collector of transistor TR3 being likewise connected through resistor R17 to the junction of rectifier R*f*4 and capacitor C4. The rectifiers R*f*3 and R*f*4 are poled to conduct towards the bases of the respective transistors TR2 and TR3. With the transistor TR3 almost cut-off its collector potential tends towards the negative source potential and biases the base of the transistor TR2 negative through the parallel combination of capacitor C2 and resistor R15 so that this latter transistor is fully conducting. The application of a positive signal to the "trigger" input terminal M raises the base potential of the transistor TR2 positive tending to cut-off this transistor, and the change of potential at its collector, due to the decrease in collector current, is transferred via the parallel combination of resistor R14 and capacitor C1 to bias the base of the transistor TR3 negative thereby tending to render this transistor conductive. The consequent rise in collector potential of transistor TR3 due to the increase of collector current, is transferred via the parallel combination of resistor R15 and capacitor C2 to bias the base of the transistor TR2 more positive thereby tending further to render this transistor non-conductive. This regenerative action of the circuit continues until the condition is such that the transistor TR3 is rendered fully conductive and the transistor TR2 is almost cut-off. The resultant rise of collector potential of transistor TR3 is effective to produce a positive signal at the output terminal O. The circuit is reset by the application of a positive signal to the "reset" input terminal N, when a similar operation will take place in reverse.

The coincidence gates and associated relays used in Figs. 1 and 2 for converting a received two-out-of-five marking into a one-out-of-ten indication and selecting accordingly one out of a group of ten reading heads (for instance the GB gates and RB relays) may in a modification of the embodiments of Figs. 1 and 2 be replaced by a system such as that of Fig. 6 employing multiple-winding saturable transformers. Referring to Fig. 6, a group of ten transformers T*f*1–T*f*10 is used for selecting one out of ten reading heads in response to and in accordance with a code digit received over a group of leads L in two-out-of-five code. Each of the transformers T*f*1–T*f*10 has a core represented by the correspondingly numbered circle, an input winding WI, two control windings W1 and W2, a bias winding WB, and an output winding WO, the output windings of the several transformers being connected in a series "chain" between earth and an Output lead, so labelled. The control windings W1 and W2 of each transformer are arranged in respective series connections between earth and two of the five leads L, the particular pair of leads L with which the control windings W1 and W2 of any transformer are associated in this way being unique to that transformer, as can be seen upon examination of the connections in Fig. 6. For selecting the output of a particular reading head in a group of ten such heads—corresponding to the function of the GB gates and RB relays in Fig. 1 or of the GA gates and RA relays, GB gates and RB relays, or GC gates and RC relays in Fig. 2—the input windings WI of the transformers T*f*1–T*f*10 are connected to receive the outputs from the respective reading heads of the group concerned (not shown in Fig. 6): thus for instance in using an arrangement such as that of Fig. 6 for selecting one of the AH1 heads (Fig. 2) in dependence on the A digit of a code received for translation, the windings WI of the transformers T*f*1–T*f*10 would be connected respectively to the ten AH1 reading heads. The bias windings WB of the transformers T*f*1–T*f*10 are connected in a series "chain" between earth and a source of bias potential the magnitude of which is chosen so that, in the quiescent state, the current flowing through the bias windings saturates the transformers and thereby renders ineffective the small currents received by the input windings from the respective reading heads connected to them. When two of the leads L are marked to indicate the value of a received digit, one of the transformers, and only one, has current flowing in both its control windings W1 and W2, these currents being in such sense and of such magnitude as together to completely oppose the effect of the current in the bias winding of that transformer. The core of that particular transformer is therefore brought out of saturation and current flowing in its input winding WI from the reading head connected thereto can then induce current in the output winding WO of the transformer to produce a corresponding signal on the Output lead. The circuit conditions are chosen to require that both control windings W1 and W2 of any transformer must carry current from the leads L before its core is brought out of saturation: therefore although several other transformers have current flowing in one of their control windings W1 or W2 when leads L are marked in two-out-of-five code, the cores of these other transformers remain sufficiently saturated to prevent input current in their WI windings from being effective to produce any output. Consequently the signal obtained at the Output lead is a repetition of the binary digits read from the magnetic drum by the reading head selected in dependence on the code digit received over the leads L, and this output signal can then be utilised as required according to the function fulfilled by the arrangement: for instance in using three such transformer groups in Fig. 2 for the selection of three address track reading heads in accordance with the A, B and C code digits, the outputs from the three transformer groups would be applied to the gate G7 to open that gate on simultaneous occurrence of the outputs. On the other hand, in modifying Fig. 1 ten transformer groups such as that of Fig. 6 each associated with a different group of ten reading heads H for selecting one head from each group in dependence on a received B digit, could have their outputs applied respectively to the input windings WI in yet another, similar group of ten transformers by which one of these outputs—corresponding to the digits read by the selected head in a selected one of the groups, would be selected in similar manner in dependence on the A digit received.

In this latter modification a measure of economy in the provision of leads may be effected, in respect of the ten groups of transformers associated with the ten groups of reading heads, by connecting between earth and the five leads over which a code digit is signalled, respective series circuits each including all those transformer control windings (W1 or W2) which have to be energised when the appertaining lead is marked. As a development of this, instead of the outputs from the several transformer groups being applied to a further, similar transformer group for selection, the output windings WO of all the transformers could be connected in one series chain between earth and a single output terminal, and the bias windings WB then used to select from which transformer group the output is taken, this being done by arranging that, when the output from a particular group is required, the bias current in the other transformer groups is increased to a value such as to maintain saturation in all the transformers therein in spite of one transformer in each such other group having both its control windings energised at this time. A similar arrangement employing an appropriate number of saturable transformers, one for each translation track reading head TH, could be used to replace the GD gates and RD relays, and possibly also the CR relays, in Fig. 2. To this end the marking of two of the L4 leads to indicate the translation digit required would be arranged to energise the two control windings of only those transformers which are connected to the TH heads pertaining to that digit in the two choices of translation, while the marking of one of the "choice" leads L5 or L6 to indicate which of the two alternative translations is required, would be arranged to bring about an increase in the bias of those transformers which are connected to TH reading heads pertaining to the other alternative, thereby maintaining the saturation of these latter transformers so that only the transformers relating to the particular digit and choice can pass the binary digits read thereby to the gates G9—G13.

For initially writing the translation information and, for Fig. 2, the address identification information into the drum, and for effecting any subsequent modification of such information, the same track selection and address selection apparatus may be employed, whether comprising conversion gates and associated relays as described in connection with Figs. 1 and 2 or, where appropriate, multiple winding saturable transformers as described in connection with Fig. 6. The heads would be selected as before but would be connected by suitable switching means to writing amplifiers to which the input information is applied, instead of to the reading amplifiers used when translations are being abstracted. Since writing operations are infrequent once the information has been initially stored, it is unnecessary to provide complex switching arrangements and the switching means may simply take the form of manually operable switches or suitable relays or the like. Where saturable transformers are used for head selection, care would have to be taken, when writing in information, to ensure that the writing currents for the heads, being necessarily of relatively high value, do not take unselected transformers partially out of saturation by excessively counteracting the effect of the bias current in their bias windings, since this could result in spurious writing signals. To guard against this sufficient bias current to maintain saturation must be flowing in the bias windings of the unselected saturable transformers when writing operations are taking place.

It is contemplated that a common translator in accordance with the invention may be employed in conjunction with a number of register-senders which would be connected to it in turn. Assuming that a period corresponding to one revolution of the storage drum is required for the translator to receive a code from a register-sender, and a similar period is required for sending the translation back to the register-sender, the translating operation itself taking one revolution, then if the drum rotates at 3000 revolutions per minute, or one revolution in 20 ms., the total time for which each register-sender is connected to the translator must be 60 ms. It may be arranged however that while one register-sender is receiving a translation from the translator another is sending a code to it, with the result that the effective holding time per register-sender can be reduced to 40 ms. If the register-senders operate with the inter-train pauses of 800 ms. and each takes the digits of a translation one at a time during these pauses, then it will be seen that 20 register-senders could share one translator. A greater number than this could be catered for by increasing the duration of the inter-train pauses or by selecting for connection to the translator only those register-senders having a code to be translated, rather than all the register-senders in turn.

The register-senders could be connected in turn to the translator by means of gating circuits opened at appropriate times by pulses derived from a scanning pulse generator constituted for example by some form of cyclic counter having a number of positions (corresponding to the number of register-senders) between which it may be stepped by the pulse AP referred to in connection with Figs. 1 and 2. Since the register-senders are connected one at a time, a common set of input leads to and output leads from the translator could be used, this having been indicated in Figs. 1 and 2 by the square brackets applied to the leads L1—L7. If the translator receives a code from one register-sender at the same time it is sending a translation to another, the pulse input leads to the input and output gates of each register-sender would require connection to different positions on the counting chain used for the scanning pulse generator.

The use of two-out-of-five code throughout enables errors in operation to be more readily detected since if one marking is missing from an input signal or a relay contact in the translator fails to make, or a gate fails to open, the translator will fail to send out a digit, whereas if an excess marking is present in an input signal, or a relay contact fails to break, or a gate opens at the wrong time, then the output signal would contain more than two markings. An overall check on the operation of the translator could thus be obtained automatically by providing a circuit to check its output signals and verify that they always contain two and only two markings.

The use of a magnetic storage drum in a translator in the manner set forth has among its advantages the fact that changes required in the stored translations consequent on routing changes can be made automatically from information in the form of a punched tape or punched cards, it being possible to do this in a central office. This helps to ensure that any such changes will be effected correctly.

What we claim is:

1. Translating equipment for automatic switching systems exemplified by automatic telephone exchanges, employing an information storage device adapted for the storage at different addresses thereon of digital translation information corresponding to different codes, means for receiving from a register-sender separate from said equipment a code registered therein for which translation is required, and means responsive to such a registered code as received by the translation equipment for selecting the address on the storage device at which the appropriate translation information is stored and for sending such information back to the register-sender.

2. Translating equipment for automatic switching systems exemplified by automatic telephone exchanges, comprising an information storage device adapted for storing in serial form, at different addresses thereon, digital translation information corresponding to different codes, a plurality of reading heads associated with respective storage tracks on said device, selection means responsive to part of a received code for selecting from said heads the one associated with the track containing a translation for said code at an address thereon, and gating means governed by the remaining part of said code for selecting from the output of the selected reading head that portion thereof corresponding to the translation information stored at said address.

3. Translating equipment for automatic switching systems exemplified by automatic telephone exchanges, comprising an information storage device adapted for storing in serial form, at different addresses thereon, digital translation information corresponding to different codes, a plurality of reading heads associated with respective storage tracks on said device, first selection means responsive to part of a received code for selecting from said heads a group of such heads including the head associated with the track containing a translation for said code at an address thereon, second selection means responsive to part of the remainder of the code to select the last-mentioned reading head from the selected group, and gating means governed by the finally remaining part of the code to select from the output of the selected head that portion thereof corresponding to the translation information stored at said address.

4. Translating equipment for automatic switching systems exemplified by automatic telephone exchanges, comprising an information storage device adapted for storing in serial form, at different addresses thereon, digital translation information corresponding to different codes and constituting at each address alternative translations for the appertaining code, a plurality of reading heads associated with respective storage tracks on said device, selection means responsive to part of a received code for selecting from said heads the one associated with the track containing a translation for said code at an address thereon, gating means governed by the remaining part of said code for selecting from the output of the selected reading head that portion thereof corresponding to the translation information stored at said address, and further gating means governed according to a required choice of translation for said code to select from said portion of the output from the selected reading head that portion thereof pertaining to the required translation.

5. Translating equipment for automatic switching systems exemplified by automatic telephone exchanges, comprising an information storage device adapted for storing in serial form, at different addresses thereon, digital translation information corresponding to different codes, a plurality of reading heads associated with respective storage tracks on said device, selection means responsive to part of a received code for selecting from said heads the one associated with the track containing a translation for said code at an address thereon, gating means governed by the remaining part of said code for selecting from the output of the selected reading head that portion thereof corresponding to the translation information stored at said address, and additional gating means governed in accordance with a particular translation digit required and effective to select, from said portion of the output from the selected reading head, that portion thereof that relates to said translation digit.

6. Translating equipment conforming to claim 1 and adapted for use with the digital translation information stored in the storage device in serial form, said equipment comprising a plurality of reading heads associated with respective storage tracks on the storage device, selection means responsive to at least part of a received code for selecting from said heads the one associated with the track containing a translation for said code at an address thereon, and gating means for selecting from the output of the selected reading head that portion thereof corresponding to a required part of the translation information stored at said address, which gating means is governed in its selecting operation by the application thereto of synchronised pulse trains the pulses of which coincide in time with the appearance at the gating means of that part of the read translation information required to be selected.

7. Translating equipment conforming to claim 1 and adapted for use with the digital translation information stored in the storage device in serial form, said equipment comprising a plurality of reading heads associated with respective storage tracks on the storage device, selection means responsive to at least part of a received code for selecting from said heads the one associated with the track containing a translation for said code at an address thereon, and gating means for selecting from the output of the selected reading head that portion thereof corresponding to a required part of the translation information stored at said address, said selection means including, for the selection of a particular reading head from a group thereof, a selecting circuit comprising a plurality of saturable transformers, one for each head in said group, each including input winding means for receiving the output from the appertaining head, bias winding means for maintaining the transformer saturated in quiescent state, and output winding means connected in common with the output winding means of the other transformers between output terminals for the circuit, said transformers also including respective control winding means connected to be selectively energised, in accordance with the reading head to be selected, to de-saturate only the particular transformer associated with that head, whereby said transformer is rendered responsive to output from its associated reading head to provide a corresponding output at said terminals.

8. Translating equipment for automatic switching systems exemplified by automatic telephone exchanges, comprising an information storage device adapted for storing in parallel form, on a plurality of translation tracks at addresses on the storage device each identified by digits stored there on a unique combination of address tracks, digital translation information corresponding to different codes, a plurality of reading heads associated respectively with said tracks, selection means responsive to a received code for selecting, from the reading heads associated with the address tracks, those heads associated with the unique combination of address tracks by which an address containing a translation for said code is identified, and gating means governed by the outputs from the selected address track heads and effective to select, from the outputs of the reading heads associated with said translation tracks, that digital portion of the last-mentioned outputs which corresponds to the translation information stored at said address.

9. Translating equipment conforming to claim 8 and adapted for use with each address on the storage device identified by digits stored on a unique combination of address tracks taken one from each of a number of groups thereof, wherein said selection means comprises means responsive to different parts of a received code for selecting from the reading heads associated with each group of address tracks, the reading head associated with the particular track included from the group in such combination.

10. Translating equipment as claimed in claim 8 including a coincidence gating circuit connected to receive the outputs from the selected address track reading heads and on coincidence of said outputs, as obtained uniquely at an address containing a translation for the received code, to provide an output which governs the operation of said gating means to select the required portion of the outputs from the translation track reading heads.

11. Translating equipment conforming to claim 8 and adapted for use with at least two translations stored for a given code at the same address, said equipment including further selecting means governed according to a required choice of translation for such code to select from the translation track reading heads those heads which are associated with the translation tracks on which the translation information pertaining to said required choice is stored.

12. Translating equipment as claimed in claim 8 including additional selecting means governed in accordance with a particular translation digit required and effective to select from the translation track reading heads each head associated with a translation track on which translation information relating to that digit is stored.

13. Translating equipment as claimed in claim 8 wherein said selection means includes, for the selection of a particular reading head from a group thereof, a selecting circuit comprising a plurality of saturable transformers, one for each head in said group, each including input winding means for receiving the output from the appertaining head, bias winding means for maintaining the transformer saturated in quiescent state, and output winding means connected in common with the output winding means of the other transformers between output terminals for the circuit, said transformers also including respective control winding means connected to be selectively energised, in accordance with the reading head to be selected, to de-saturate only the particular transformer associated with that head, whereby said transformer is rendered responsive to output from its associated reading head to provide a corresponding output at said terminals.

References Cited in the file of this patent

UNITED STATES PATENTS

| | | |
|---|---|---|
| 2,738,382 | Brookes et al. | Mar. 13, 1956 |
| 2,764,634 | Brookes et al. | Sept. 25, 1956 |